US008908017B2

(12) United States Patent
Sung et al.

(10) Patent No.: US 8,908,017 B2
(45) Date of Patent: Dec. 9, 2014

(54) METHOD FOR DRIVING GLASSES-TYPE STEREOSCOPIC DISPLAY PREVENTING VISUAL FATIGUE AND REFRACTIVE INDEX-VARIABLE SHUTTER GLASSES

(75) Inventors: Gee Young Sung, Daegu-si (KR); Du Sik Park, Suwon-si (KR); Dong Kyung Nam, Yongin-si (KR); Yun Tae Kim, Suwon-si (KR); Ju Yong Park, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1258 days.

(21) Appl. No.: 12/382,819

(22) Filed: Mar. 24, 2009

(65) Prior Publication Data
US 2010/0091095 A1     Apr. 15, 2010

(30) Foreign Application Priority Data
Oct. 15, 2008    (KR) .......................... 10-2008-0101086

(51) Int. Cl.
*H04N 13/04*      (2006.01)
(52) U.S. Cl.
CPC ....... *H04N 13/0438* (2013.01); *H04N 13/0434* (2013.01)
USPC .............................................. 348/53; 349/15
(58) Field of Classification Search
CPC ....................... H04N 13/0438; H04N 13/0434
USPC ................ 348/53; 349/15; 345/419; 359/462
See application file for complete search history.

(56) References Cited

U.S. PATENT DOCUMENTS

| | | | |
|---|---|---|---|
| 7,604,348 B2 * | 10/2009 | Jacobs et al. ................... | 351/159 |
| 2006/0153289 A1 * | 7/2006 | Choi et al. ............... | 375/240.01 |
| 2007/0097024 A1 * | 5/2007 | Jung et al. ........................ | 345/32 |
| 2007/0176914 A1 * | 8/2007 | Bae et al. ...................... | 345/204 |
| 2007/0229951 A1 * | 10/2007 | Jung et al. ..................... | 359/465 |
| 2008/0303832 A1 * | 12/2008 | Kim et al. ..................... | 345/501 |

(Continued)

FOREIGN PATENT DOCUMENTS

| | | |
|---|---|---|
| JP | 07-167633 | 7/1995 |
| JP | 08-331601 | 12/1996 |

(Continued)

OTHER PUBLICATIONS

Korean Office Action issued Jul. 15, 2014 in Korean Patent Application No. 10-2008-0101086.

*Primary Examiner* — Haresh N Patel
(74) *Attorney, Agent, or Firm* — Staas & Halsey LLP

(57) ABSTRACT

Disclosed are a method for driving a glasses-type stereoscopic display preventing visual fatigue and refractive index-variable shutter glasses. The method includes generating a plurality of left-eye viewing point images and a plurality of right-eye viewing point images. The plurality of left-eye viewing point images and right-eye viewing point images have viewing points different from each other. An initial left-eye viewing point image and a subsequent left-eye viewing point image of the plurality of left-eye viewing point images are output, and an initial right-eye viewing point image and a subsequent right-eye viewing point image of the plurality of right-eye viewing point images are output. Each of the plurality of left-eye viewing point images and right-eye viewing point images is inputted into a single pupil. The glasses include a refractive index control unit to control a strength of an electric field to vary a refractive index of the glasses.

7 Claims, 9 Drawing Sheets

(56) References Cited

U.S. PATENT DOCUMENTS

| | | | |
|---|---|---|---|
| 2008/0316378 A1* | 12/2008 | Huang et al. | 349/15 |
| 2008/0316596 A1* | 12/2008 | Cha et al. | 359/463 |
| 2009/0002482 A1* | 1/2009 | Cho et al. | 348/43 |
| 2009/0073558 A1* | 3/2009 | Jacobs et al. | 359/464 |
| 2009/0091708 A1* | 4/2009 | Greene | 353/7 |
| 2009/0128900 A1* | 5/2009 | Grasnick | 359/462 |
| 2009/0201362 A1* | 8/2009 | Shestak et al. | 348/56 |
| 2010/0033479 A1* | 2/2010 | Hirayama et al. | 345/419 |
| 2010/0111444 A1* | 5/2010 | Coffman | 382/285 |
| 2010/0232016 A1* | 9/2010 | Landa et al. | 359/466 |

FOREIGN PATENT DOCUMENTS

| | | |
|---|---|---|
| JP | 11-194299 | 7/1999 |
| JP | 2000-276595 | 10/2000 |
| JP | 2000-278719 | 10/2000 |
| JP | 2004-333661 | 11/2004 |
| JP | 2006-333400 | 12/2006 |
| JP | 4046121 | 11/2007 |
| KR | 10-2005-0072179 | 7/2005 |

* cited by examiner

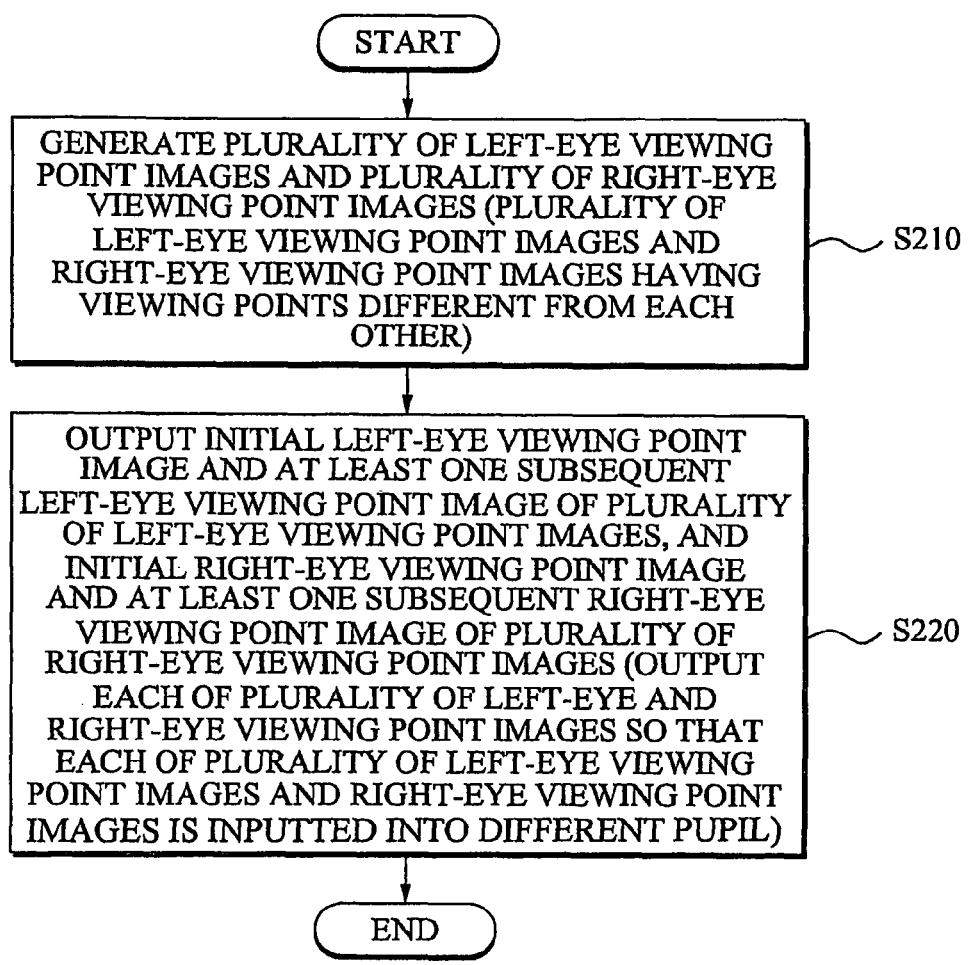

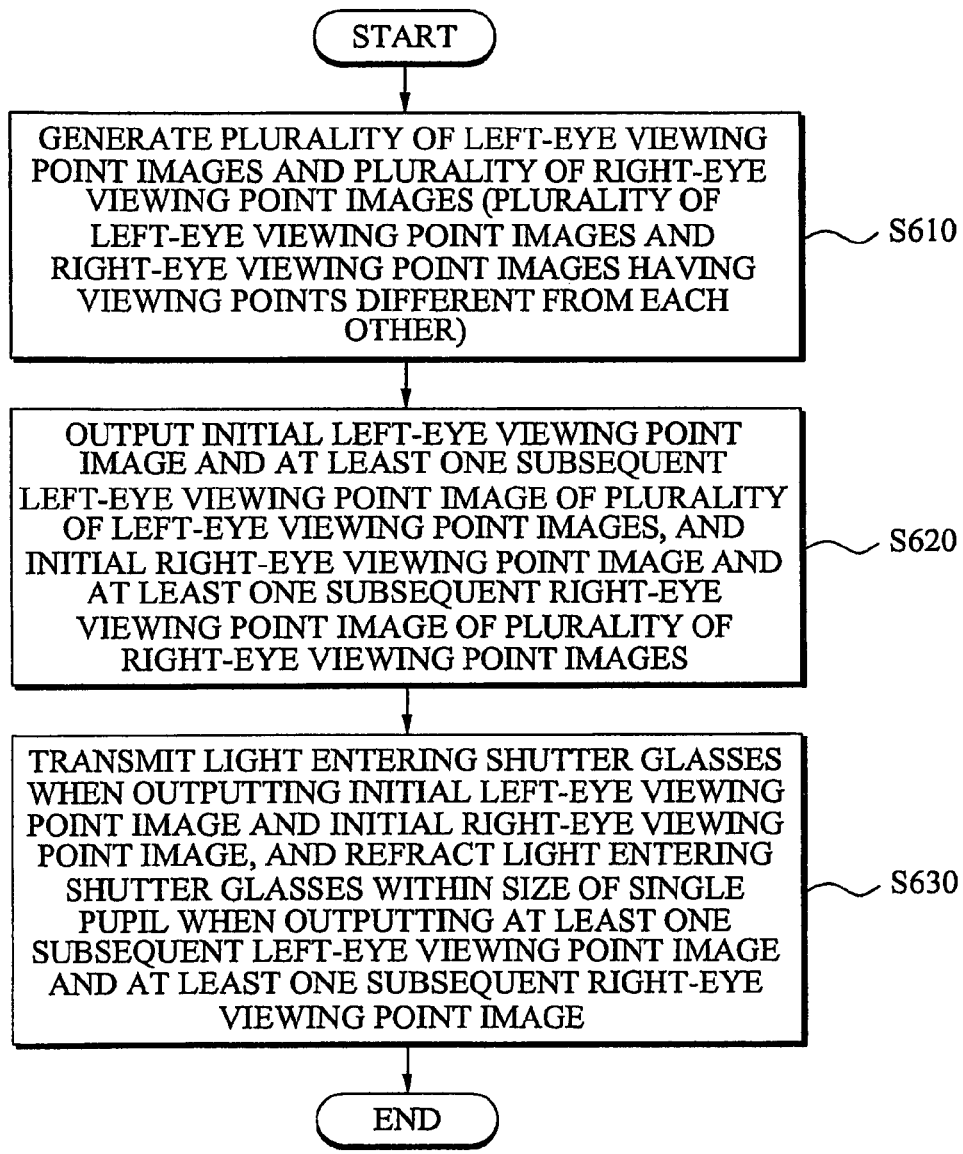

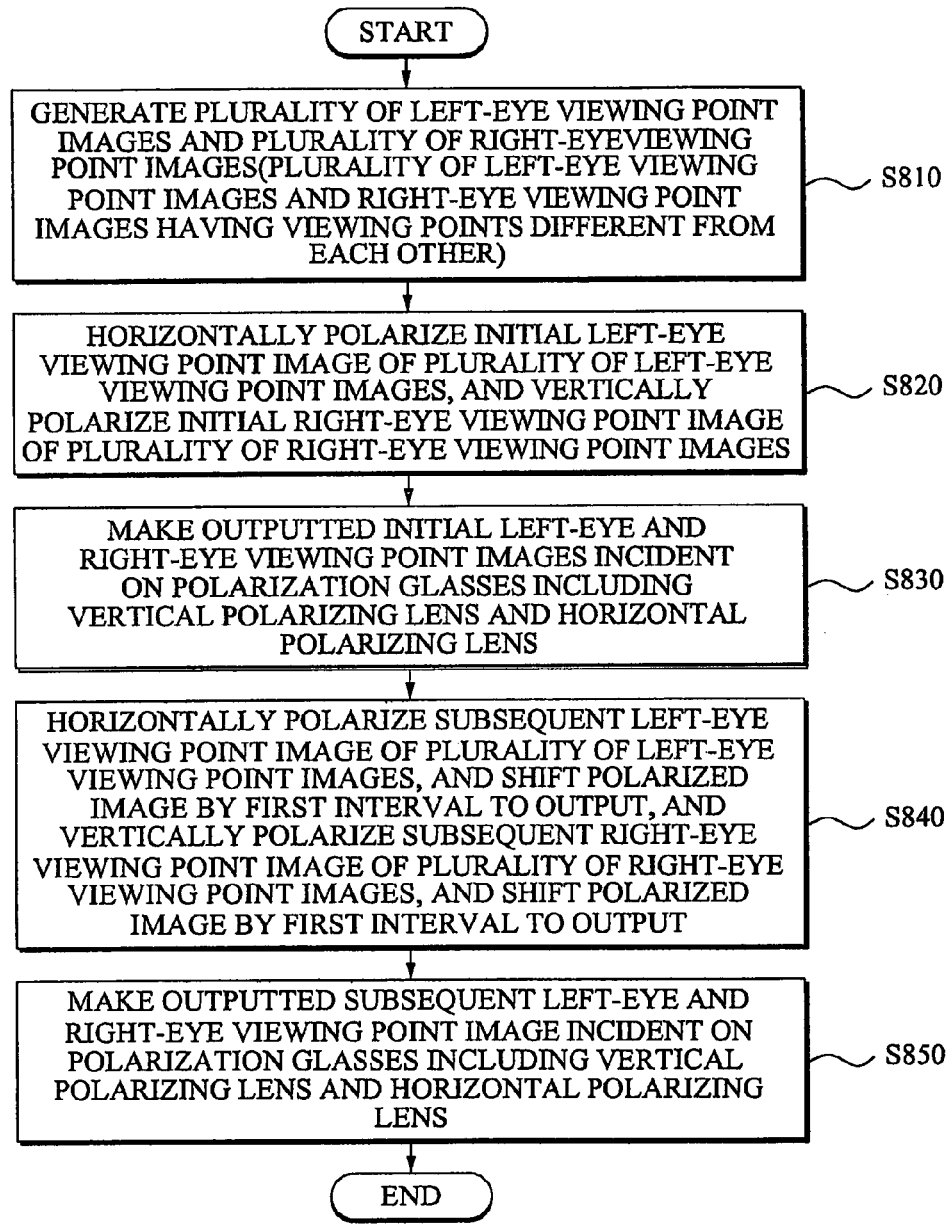

METHOD FOR DRIVING GLASSES-TYPE STEREOSCOPIC DISPLAY PREVENTING VISUAL FATIGUE AND REFRACTIVE INDEX-VARIABLE SHUTTER GLASSES

CROSS-REFERENCE TO RELATED APPLICATION

This application claims the benefit of Korean Patent Application No. 10-2008-0101086, filed on Oct. 15, 2008, in the Korean Intellectual Property Office, the disclosure of which is incorporated herein by reference.

BACKGROUND

1. Field

Example embodiments relate to a method for driving a glasses-type stereoscopic display preventing visual fatigue and refractive index-variable shutter glasses, and more particularly, to a technique that may implement a glasses-type stereoscopic display by enabling images having different viewing points from each other to be inputted into a single pupil, thereby preventing visual fatigue from occurring.

2. Description of the Related Art

So that a user may view three dimensional (3D) images without wearing glasses, a display through which different images are viewed depending on a location of eyes of the user may be needed, and as a representative technique for addressing this need, a glasses-type stereoscopic display or non-glasses type stereoscopic display may be provided according to the presence/absence of glasses.

In this instance, a principle of implementing the glasses-type stereoscopic display may be applied such that different viewing point images are viewed in the left-eye and right-eye of a user to enable the user to feel 3D effects. An actual left-eye viewing point image and an actual right-eye viewing point image may be displayed on a two dimensional (2D) display, however, a viewer may experience 3D effects at a location where the two left-eye and right-eye viewing point images are overlapped. There occurs a vergence-accommodation conflict between a location where the 2D images viewed by each of the left-eye and right-eyes are displayed and a location where the 3D images seem to be viewed by both the left-eye and right-eye, and which has been known as one of principle factors causing visual fatigue of the stereoscopic display.

Therefore, there is a need for a glasses-type stereoscopic display technique that may overcome limitations of an existing stereoscopic display technique, and prevent visual fatigue from occurring.

SUMMARY

Example embodiments may, but not necessarily, provide a method for driving a glasses-type stereoscopic display in which each of a plurality of viewing point images having different viewing points from each other may be inputted into a single pupil, so that a focus location of a single eye is positioned on a location where three dimensional (3D) images are generated, thereby preventing visual fatigue from occurring.

Example embodiments may, but not necessarily, also provide a method for driving a glasses-type stereoscopic display in which a plurality of viewing point images may be refracted using shutter glasses, so that each of the plurality of viewing point images are inputted into a single pupil without shifting the viewing point images to output the shifted images, thereby implementing a glasses-type stereoscopic display preventing visual fatigue, and also in which a user may view the viewing point images using polarization glasses, thereby preventing visual fatigue from occurring.

According to an example embodiment, there may, but not necessarily, be provided a method for driving a glasses-type stereoscopic display, the method including: generating a plurality of left-eye viewing point images and a plurality of right-eye viewing point images, the plurality of left-eye viewing point images and right-eye viewing point images having different respective viewing points; and outputting an initial left-eye viewing point image of the plurality of left-eye viewing point images and a subsequent left-eye viewing point image of the plurality of left-eye viewing point images, and an initial right-eye viewing point image of the plurality of right-eye viewing point images and a subsequent right-eye viewing point image of the plurality of right-eye viewing point images. In this instance, the outputting may, but not necessarily, output each of the plurality of left-eye and right-eye viewing point images so that each of the plurality of left-eye viewing point images and right-eye viewing point images is inputted into a single respective pupil of a left-eye pupil and a right-eye pupil of a user.

Also, the outputting the subsequent left-eye viewing point image may, but not necessarily, shifting the subsequent left-eye viewing point image by a first interval and outputting the shifted subsequent left-eye viewing point image so that the plurality of left-eye viewing point images are inputted into a left-eye pupil, and the outputting the subsequent right-eye viewing point image may, but not necessarily, shifting the subsequent right-eye viewing point image by the first interval and outputting the shifted subsequent right-eye viewing point image so that the plurality of right-eye viewing point images are inputted into a right-eye pupil.

Also, the outputting may, but not necessarily, outputting the initial left-eye viewing point image prior to the subsequent left-eye viewing point image, and outputting the initial right-eye viewing point image prior to the subsequent right-eye viewing point image.

According to another example embodiment, there may, but not necessarily, be provided a method for driving a glasses-type stereoscopic display, the method including: generating a plurality of left-eye viewing point images and a plurality of right-eye viewing point images, the plurality of left-eye viewing point images and right-eye viewing point images having different respective viewing points; outputting an initial left-eye viewing point image of the plurality of left-eye viewing point images and a subsequent left-eye viewing point image of the plurality of left-eye viewing point images, and an initial right-eye viewing point image and a subsequent right-eye viewing point image of the plurality of right-eye viewing point images; and transmitting a light entering shutter glasses of the stereoscopic display when outputting the initial left-eye viewing point image and the initial right-eye viewing point image, and refracting the light entering the shutter glasses within a size of a single pupil of a user when outputting the subsequent left-eye viewing point image and the subsequent right-eye viewing point image.

In this instance, the shutter glasses may, but not necessarily, include a first substance having a fixed refractive index and a second substance having a variable refractive index, and the method further includes varying the refractive index of the second substance according to a strength of an electric field to thereby transmit or refract light incident on the second substrate.

According to still another example embodiment, there may, but not necessarily, be provided refractive index-variable shutter glasses, the shutter glasses including: an optical input unit having a fixed refractive index and to receive a light; an optical output unit positioned on a side of the optical input unit, and to having a variable refractive index according to a strength of an electric field; and a refractive index control unit to control the strength of the electric field so as to vary the refractive index of the optical output unit.

In this instance, the refractive index control unit may, but not necessarily, control the refractive index of the optical output unit to be identical to or different from the refractive index of the optical input unit to correspond to a synchronization of an output image.

According to yet another example embodiment, there may, but not necessarily, be provided a method for driving a glasses-type stereoscopic display, the method including: generating a plurality of left-eye viewing point images and a plurality of right-eye viewing point images, the plurality of left-eye viewing point images and right-eye viewing point images having different respective viewing points; polarizing an initial left-eye viewing point image of the plurality of left-eye viewing point images and an initial right-eye viewing point image of the plurality of right-eye viewing point images, and outputting the polarized initial images; making the outputted initial left-eye and right-eye viewing point images incident on polarization glasses including a vertical polarizing lens and a horizontal polarizing lens; polarizing a subsequent left-eye viewing point image of the plurality of left-eye viewing point images and a subsequent right-eye viewing point image of the plurality of right-eye viewing point images, shifting the polarized subsequent images by a first interval, and outputting the shifted images; and making the outputted subsequent left-eye and right-eye viewing point images incident on the polarization glasses including the vertical polarizing lens and the horizontal polarizing lens.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects example embodiments will become apparent and more readily appreciated from the following description, taken in conjunction with the accompanying drawings of which:

FIG. 2 is a flowchart illustrating a method for driving a glasses-type stereoscopic display preventing visual fatigue according to example embodiments;

FIG. 6 is a flowchart illustrating a method for driving a glasses-type stereoscopic display preventing visual fatigue using shutter glasses according to example embodiments;

FIG. 8 is a flowchart illustrating a method for driving a glasses-type stereoscopic display preventing visual fatigue using polarization glasses according to example embodiments.

DETAILED DESCRIPTION

Figure 1A:
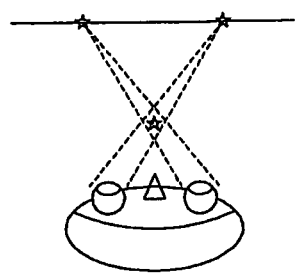
FIGS. 1A, 1B, and 1C are diagrams illustrating a multi-view display according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

Figure 1B:
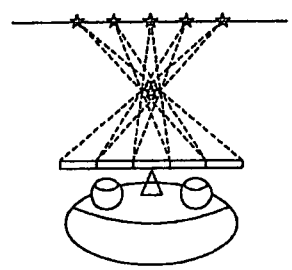
Figure 1C:
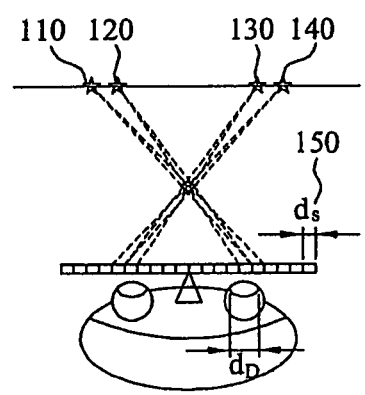

FIGS. 1A, 1B, and 1C are diagrams illustrating a multi-view display according to example embodiments.

FIG. 1A shows a two-view display using two images of left and right images, and FIG. 1B shows a multi-view display using more than two images. Here, in both the two-view display and the multi-view display, a single image may be inputted into a single pupil.

FIG. 1C shows a super multi-view display, in which at least two viewing point images may be inputted into a single pupil in a monocular multi-view type. For example, when a first right-eye viewing point image 110 is outputted and the outputted image is shifted by a predetermined interval to output a second right-eye viewing point image 120, or when a first left-eye viewing point image 130 is outputted and the outputted image is shifted by a predetermined interval to output a second left-eye viewing point image 140, the predetermined interval may be appropriately controlled so that a size $d_s$ 150 of a single viewing point image inputted into the pupil is controlled, and a plurality of images are inputted into a single pupil $d_D$.

When the above-mentioned super multi-view display is implemented, control of a focus location by a single eye may be performed at a location where three dimensional (3D) images are generated, which is different from a two dimensional (2D) display surface. Accordingly, discordance between a vergence of 3D images and an accommodation of actual 2D images may occur in the multi-view display, however, the vergence of 3D images and the accommodation of 2D images may coincide with each other in the super multi-view display, thereby preventing visual fatigue from occurring.

When the above-mentioned super multi-view display is implemented, a glasses-type stereoscopic display preventing visual fatigue may be implemented.

FIG. 2 is a flowchart illustrating a method for driving a glasses-type stereoscopic display preventing visual fatigue according to example embodiments.

Referring to FIG. 2, in operation S210, a plurality of left-eye viewing point images and a plurality of right-eye viewing point images may be generated. In this instance, the plurality of left-eye viewing point images and right-eye viewing point images may have different viewing points from each other. The plurality of left-eye and right-eye viewing point images may be obtained by photographing images while changing a photographing viewing point and photographing angle, and the plurality of viewing point images may be generated with respect to each of the left-eye and right-eye.

In operation S220, an initial left-eye viewing point image and at least one subsequent left-eye viewing point image of the plurality of left-eye viewing point images, and an initial right-eye viewing point image and at least one subsequent right-eye viewing point image of the plurality of right-eye viewing point images may be outputted. Here, the initial left-eye viewing point image may denote an image initially outputted on a screen, and the subsequent left-eye viewing point image may denote an image subsequently outputted after the initial left-eye viewing point image. For example, when a first left-eye viewing point image, a second left-eye viewing point image, and a third left-eye viewing point image are outputted so as to input in the left-eye of the user, the first left-eye viewing point image initially outputted on the screen may designate the initial left-eye viewing point image, and the second and third left-eye viewing point images outputted after the first left-eye viewing point image may designate the subsequent left-eye viewing point image.

In this instance, in outputting the plurality of left-eye and right-eye viewing point images, each of the plurality of left-eye and right-eye viewing point images may be inputted into a single pupil. When outputting the at least one subsequent left-eye viewing point image, the at least one subsequent left-eye viewing point image may be shifted by a first interval, and the shifted at least one subsequent left-eye viewing point image may be outputted, so that the plurality of left-eye viewing point images are inputted into a left-eye pupil. Also, when outputting the at least one subsequent right-eye viewing point image, the at least one subsequent right-eye viewing point image may be shifted by the first interval, and the shifted at least one subsequent right-eye viewing point image may be outputted, so that the plurality of right-eye viewing point images are inputted into a right-eye pupil. Here, the first interval may be calculated through an experiment based on a size of the pupil and viewing distance, so that the plurality of viewing point images are inputted into a single pupil. For example, when the first, second, and third left-eye viewing point images are outputted so as to input the left-eye, the second left-eye viewing point image may shifted by a first interval from a location where the first left-eye viewing point image is outputted, and then the shifted second left-eye viewing point image may be outputted, and the third left-eye viewing point image may be further shifted by the first interval from a location where the second left-eye viewing point image is outputted, and then the shifted third left-eye viewing point image may be outputted. Here, the right-eye viewing point images may be outputted in a similar manner as that in the left-eye viewing point images.

Here, the initial left-eye viewing point image may be outputted prior to the subsequent left-eye viewing point image, and the initial right-eye viewing point image may be outputted prior to the subsequent right-eye viewing point image. The initial left-eye viewing point image and the subsequent left-eye viewing point image may be consecutively outputted, or the right-eye viewing point image may be outputted between the initial left-eye viewing point image and the subsequent left-eye viewing point image.

As described above, the plurality of viewing point images having different viewing points from each other may be shifted by a predetermined interval and the shifted images may be outputted, so that the plurality of viewing point images are inputted into a single pupil, thereby implementing the glasses-type stereoscopic display preventing visual fatigue.

Figure 3:
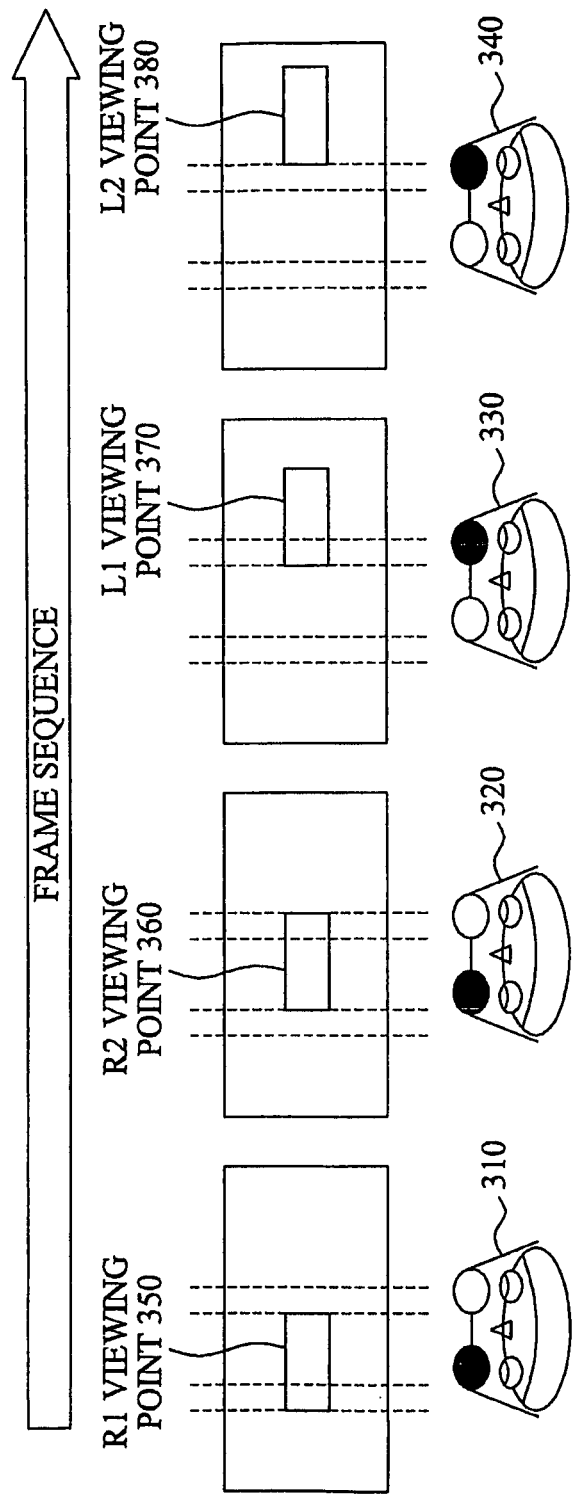
FIGS. 3 and 4 are diagrams illustrating operations of a glasses-type stereoscopic display preventing visual fatigue according to example embodiments.
Figure 4:
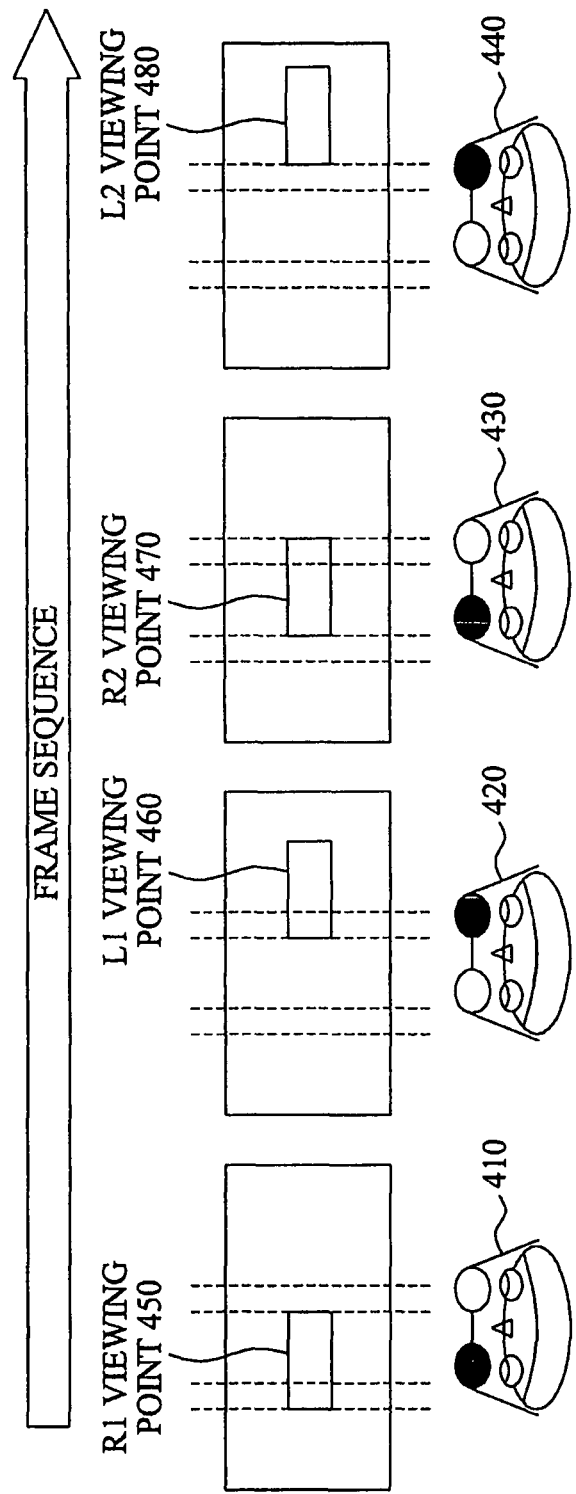

FIGS. 3 and 4 are diagrams illustrating operations of a glasses-type stereoscopic display preventing visual fatigue according to example embodiments.

FIGS. 3 and 4 show examples for implementing the glasses-type stereoscopic display preventing visual fatigue using two left-eye viewing point images and two right-eye viewing point images. Referring to FIG. 3, a first right-eye viewing point image (R1) 350 corresponding to a right-eye may be displayed, and then a second right-eye viewing point image (R2) 360, that is, another right-eye viewing point image corresponding to the right-eye may be shifted by a first interval and displayed. The displayed viewing point images 350, 360, 370, and 380 may be inputted into a pupil through glasses 310, 320, 330, and 340 worn by the user. In this instance, the first right-eye viewing point image and the second right-eye viewing point image may be obtained by photographing while varying a photographing viewing point. For example, an image photographed by moving a viewing point by a predetermined angle from a viewing point where the first right-eye viewing point image is photographed may be generated as the second right-eye viewing point image. Also, the first interval by which the second right-eye viewing point image is shifted may be calculated based on at least one of a size of the pupil (for example, 3 mm to 8 mm) and a viewing distance, so that the plurality of viewing point images are inputted into a single pupil. The second right-eye viewing point image (R2) may be shifted to be imaged less than the size of the pupil in comparison with the first right-eye viewing point image (R1). Accordingly, in this manner, two viewing point images may be inputted into the right-eye pupil.

Next, a first left-eye viewing point image (L1) 370 corresponding to a left-eye may be displayed, and then a second left-eye viewing point image (L2) 380, that is, another left-eye viewing point image corresponding to the left-eye may be shifted by a first interval and displayed. In this instance, the first and second left-eye viewing point images may be obtained by photographing while varying a photographing viewing point. For example, an image photographed by moving a viewing point by a predetermined angle from a viewing point where the first left-eye viewing point image is photographed may be generated as the second left-eye viewing point image. Also, the first interval by which the second left-eye viewing point image is shifted may be calculated based on at least one of the size of the pupil and viewing distance, so that the plurality of viewing point images are inputted in a single pupil.

According to the present example embodiments, the viewing point images may be displayed in a type of right 1/right 2/left 1/left 2, as opposed to being only right and left.

Referring to FIG. 4, a left-eye viewing point image and a right-eye viewing point image may be alternately displayed. A first right-eye viewing point image (R1) 450 corresponding to the right-eye may be displayed, and then a first left-eye viewing point image (L1) 460 corresponding to the left-eye may be displayed. Next, a second right-eye viewing point image (R2) 470 may be outputted by being shifted by a first interval from a location where the first right-eye viewing point image 450 is outputted, and the shifted image is then outputted, and a second left-eye viewing point image (L2) 480 may be outputted by being shifted by the first interval from a location where the first left-eye viewing point image (L1) 460 is outputted, and the shifted image is then outputted. The displayed viewing point images 450, 460, 470, and 480 may be inputted into the left-eye pupil and right-eye pupil through glasses 410, 420, 430, and 440 worn by the user.

According to the present example embodiments, the viewing point images may be displayed in a type of left 1/left 2/right 1/right 2, and also in a type of left 1/right 1/left 2/right 2, and right 1/left 1/right 2/left 2.

Figure 5:
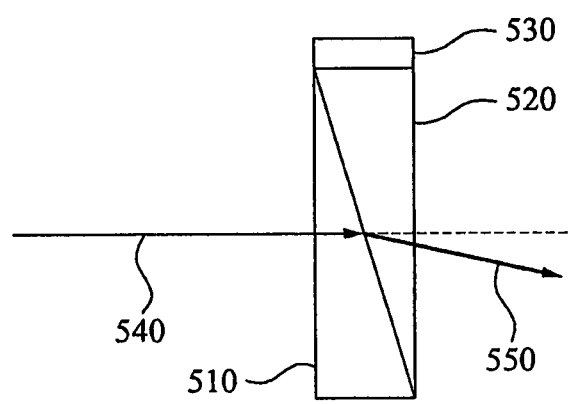
FIG. 5 is a diagram illustrating a configuration of refractive index-variable shutter glasses according to example embodiments.

FIG. 5 is a diagram illustrating a configuration of refractive index-variable shutter glasses according to example embodiments.

Referring to FIG. 5, the refractive index-variable shutter glasses according to the present example embodiments may include an optical input unit 510, an optical output unit 520, and a refractive index control unit 530.

The optical input unit 510 may have a fixed refractive index and receive a light 540. Here, as illustrated in FIG. 5, the optical input unit 510 may be formed into a shape of right triangle. In this instance, a surface of the optical input unit 510 where the light 540 enters may be perpendicular to an angle by which the light enters, however, another surface of the optical input unit 510 where the light exits the optical input unit 510 may be configured so as not to be perpendicular to the angle by which the light enters. Also, the optical input unit 510 may have the fixed refractive index, and materials such as glass, polymer, and the like may be used for the optical input unit 510.

The optical output unit 520 may be positioned on a side of the optical input unit 510, and have a variable refractive index according to a strength of an electric field. The optical output unit 520 may be configured with materials having variable refractive index according to the strength of the electric field such as liquid crystal (LC), and the like. Also, the optical output unit 520 may be configured to be joined with the optical input unit 510, and may be formed into an inverted triangle as illustrated in FIG. 5. When the refractive indices of the optical input unit 510 and optical output unit 520 are different from each other, a light passing through the optical input unit 510 may be refracted on an interface with the optical output unit 520 and may pass through the optical input unit 510 and the optical output unit 520 as light 550. When the refractive indices of the optical input unit 510 and optical output unit 520 are the same, the light passing through the optical input unit 510 may not be refracted on the interface with the optical output unit 520, and may directly pass through the optical input unit 510 and the optical output unit 520 without refraction (not shown).

The refractive index control unit 530 may control the strength of the electric field so as to vary the refractive index of the optical output unit 520. The refractive index of the optical output unit 520 may vary the strength of the electric field. Thus, when intending to refract an incident light, a power (for example, 5 V) may be applied to the optical output unit 520, so that the refractive index of the optical output unit 520 is different from that of the optical input unit 510, and when intending to directly transmit the incident light without refracting the incident light, a power (for example, 0 V is applied to the optical output unit 520) may cut off, so that the refractive index of the optical output unit 520 is the same as that of the optical input unit 510. In this instance, the strength of the electric field may determine whether the incident light is refracted, and thus may be controlled to correspond to a synchronization of an input image.

As described above, the refractive indices of the images may be controlled through the refractive index-variable shutter glasses without shifting a location of the outputted image.

FIG. 6 is a flowchart illustrating a method for driving a glasses-type stereoscopic display preventing visual fatigue using shutter glasses according to example embodiments.

Referring to FIG. 6, in operation S610, a plurality of left-eye viewing point images and a plurality of right-eye viewing point images may be generated. In this instance, the plurality of left-eye viewing point images and right-eye viewing point images may have viewing points different from each other.

In operation S620, an initial left-eye viewing point image and at least one subsequent left-eye viewing point image of the plurality of left-eye viewing point images, and an initial right-eye viewing point image and at least one subsequent right-eye viewing point image of the plurality of right-eye viewing point images may be outputted. In this instance, the subsequent left-eye viewing point image and the subsequent right-eye viewing point image may not be outputted by shifting a location thereof, and may be outputted at the same location as a location where a viewing point image is precedingly outputted.

In operation S630, when outputting the initial left-eye viewing point image and initial right-eye viewing point image, a light entering through shutter glasses may be transmitted, and when outputting the at least one subsequent left-eye viewing point image and at least one subsequent right-eye viewing point image, the light entering through the shutter glasses may be refracted within a size of a single pupil.

When outputting the initial left-eye viewing point image and initial right-eye viewing point image, a refractive index of the shutter glasses may be controlled so that an incident light is directly transmitted, and when outputting the at least one subsequent left-eye viewing point image and at least one subsequent right-eye viewing point image, the refractive index of the shutter glasses may be controlled so that the incident light is refracted. The shutter glasses may include a first substance having a fixed refractive index and a second substance having a variable refractive index, and may vary a refractive index of the second substance according to the strength of the electric field to thereby transmit or refract the incident light. Accordingly, although the subsequent viewing point images are not shifted and outputted, the refractive index of the shutter glasses may be controlled so that a location of an image inputted into the pupil is controlled.

Figure 7A:
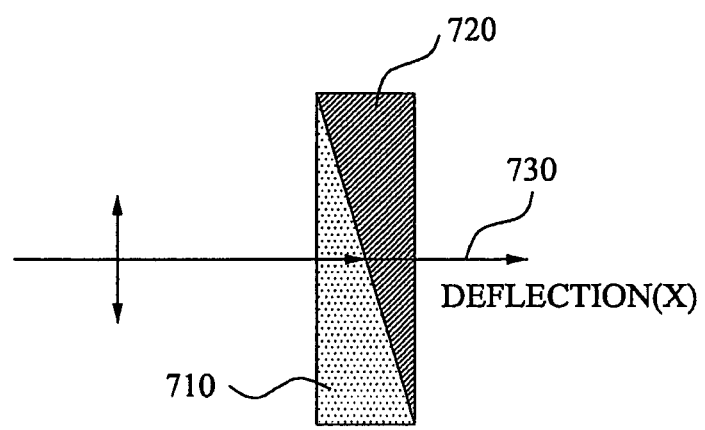
FIGS. 7A and 7B are diagrams illustrating a method for refracting images using shutter glasses according to example embodiments.
Figure 7B:
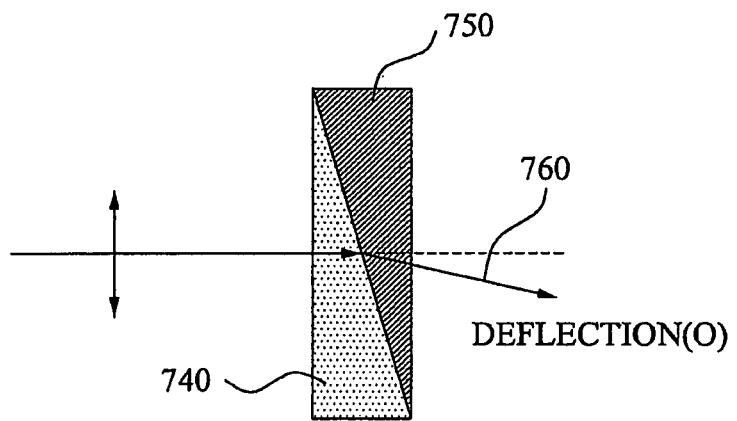

FIGS. 7A and 7B are diagrams illustrating a method for refracting images using shutter glasses according to example embodiments.

Referring to FIGS. 7A and 7B, as an example for refracting images using the shutter glasses, a glass 710 may be used as a substance having a fixed refractive index, and an LC 720 may be used as a substance having a variable refractive index. Referring to FIG. 7A, when a refractive index $n_{LC}$ of the LC 720 is controlled to be identical to a refractive index $n_{glass}$ of the glass 710, a light 730 passing through the glass 710 and entering the LC 720 may be directly transmitted without being refracted. However, in FIG. 7B, when a refractive index $n_{LC}$ of an LC 750 is controlled to be identical to a refractive index $n_{glass}$ of a glass 740, a light 760 passing through the glass 740 and the LC 750 may be refracted to thereby pass through the shutter glasses.

When using the shutter glasses, a refractive index of an incident light may be easily controlled according to the strength of the electric field.

FIG. 8 is a flowchart illustrating a method for driving a glasses-type stereoscopic display preventing visual fatigue using polarization glasses according to example embodiments.

Referring to FIG. 8, in operation S810, a plurality of left-eye viewing point images and a plurality of right-eye viewing point images may be generated. In this instance, the plurality of left-eye viewing point images and the plurality of right-eye viewing point images may have different viewing points from each other.

In operation S820, an initial left-eye viewing point image of the plurality of left-eye viewing point images and an initial right-eye viewing point image of the plurality of right-eye viewing point images may be polarized and outputted. In this instance, the initial left-eye viewing point image may be horizontally or vertically polarized and outputted, and the initial right-eye viewing point image may be horizontally or vertically polarized and outputted in inverse correspondence to a polarization of the initial left-eye viewing point image. When performing a vertical polarization on the initial left-eye viewing point image, the initial right-eye viewing point image may be horizontally polarized and outputted, and when performing a horizontal polarization on the initial left-eye viewing point image, the initial right-eye viewing point image may be vertically polarized and outputted.

In operation S830, the outputted initial left-eye and right-eye viewing point images may be made incident on polarization glasses including a vertical polarizing lens and a horizontal polarizing lens. In this instance, the polarization glasses may respectively include the vertical polarizing lens and horizontal polarizing lens at its left and right. When the vertical polarizing lens is provided at the left, the horizontal polarizing lens may be provided at the right, and when the vertical polarizing lens is provided at the right, the horizontal polarizing lens may be provided at the left.

In operation S840, the subsequent left-eye viewing point image of the plurality of left-eye viewing point images may be polarized, the polarized image may be shifted by a first interval, and the shifted image may be outputted. Also, in operation S840, the subsequent right-eye viewing point image of the plurality of right-eye viewing point images may be polarized, the polarized image may be shifted by the first interval, and the shifted image may be outputted. The subsequent left-eye viewing point may be vertically or horizontally polarized as being in the initial left-eye viewing point image, and the polarized image may be shifted by the first interval and outputted. Also, the subsequent right-eye viewing point image may be vertically and horizontally polarized to be in the initial right-eye viewing point image, and the polarized image may be shifted by the first interval and outputted. In this instance, the first interval may be calculated using at least one of a size of a pupil and viewing distance, so that each of the plurality of left-eye and right-eye viewing point images is inputted into a single pupil.

In operation S850, the outputted subsequent left-eye viewing point image and the outputted subsequent right-eye viewing point image may be made incident on the polarization glasses including the vertical polarizing lens and horizontal polarizing lens. Accordingly, the polarized initial viewing point image or subsequent viewing point image may be inputted in the left-eye or right-eye, and each of the plurality of viewing point images may be inputted into a single pupil, so that a vergence of 3D images and an accommodation of actual 2D images may coincide with each other, thereby preventing visual fatigue from occurring.

In this instance, in a case of using the shutter glasses as illustrated in FIG. 6, rapid response characteristics of a display may be needed. Thus, a glasses-type stereoscopic display preventing visual fatigue may be implemented using the polarization glasses as illustrated in FIG. 8 despite having relatively low response characteristics.

Figure 9:
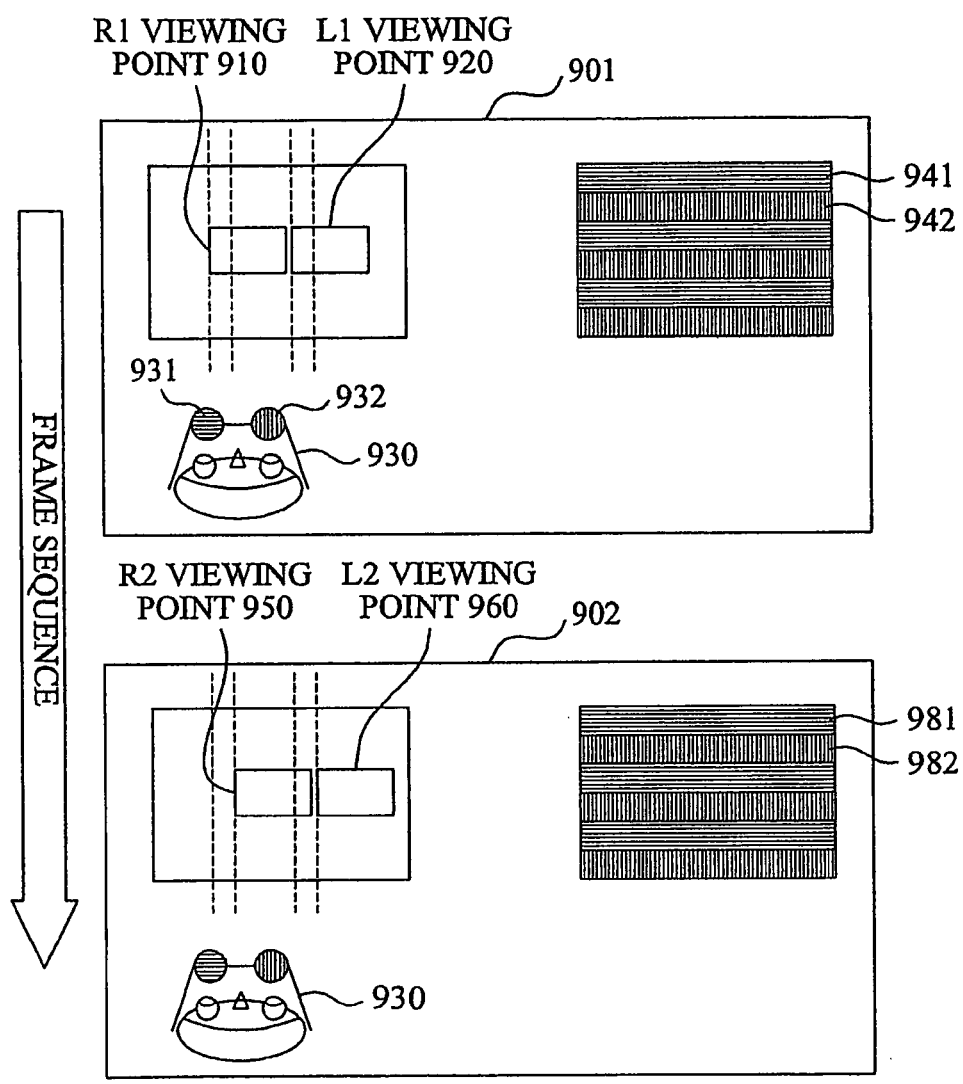
FIG. 9 is a diagram illustrating operations of a glasses-type stereoscopic display preventing visual fatigue using polarization glasses according to example embodiments.

FIG. 9 is a diagram illustrating operations of a glasses-type stereoscopic display preventing visual fatigue using polarization glasses according to example embodiments.

Referring to a first frame 901 of FIG. 9, a first right-eye viewing point image 910 and a first left-eye viewing point image 920 may be vertically and horizontally polarized as shown by polarized images 942 and 941, respectively, and then the polarized images may be outputted. The outputted first right-eye viewing point image 910 and first left-eye viewing point image 920 may be inputted into a pupil of a user through polarization glasses 930. In this instance, the polarization glasses 930 may include a horizontal polarizing lens 931 at its left and vertical polarizing lens 932 at its right, so that a horizontally polarized light passes through the left of the polarization glasses 930, and a vertically polarized light passes through the right thereof.

Also, referring to a second frame 902 of FIG. 9, a second right-eye viewing point image 950 and a second left-eye viewing point image 960 may be vertically and horizontally polarized as shown by polarized images 982 and 981, and then the polarized images may be outputted. The second right-eye viewing point image 950 and second left-eye viewing point image 960 may be shifted by a first interval from a location where the first right-eye viewing point image 910 and the first left-eye viewing point image 920 are outputted, and the shifted images may be outputted. The outputted second right-eye viewing point image 950 and second left-eye viewing point image 960 may be inputted into the pupil of the user through the polarization glasses 930, and a horizontally polarized light may pass through the left of the polarization glasses 930, and a vertically polarized light may pass through the right thereof. In this instance, the first right-eye viewing point image 910 and the second right-eye viewing point image 950 may be inputted into a right-eye pupil, and the first left-eye viewing point image 920 and the second left-eye viewing point image 960 may be inputted into a left-eye pupil, so that the vergence of 3D images and the accommodation of actual 2D images coincide with each other, thereby preventing visual fatigue from occurring.

As described above, according to the exemplary embodiments, each of a plurality of viewing point images having different viewing points from each other may be inputted into a single pupil, so that a focus location of a single eye is positioned on a location where three dimensional (3D) images are generated, thereby preventing visual fatigue from occurring.

According to the exemplary embodiments, a plurality of viewing point images may be refracted using shutter glasses, so that each of the plurality of viewing point images are inputted into a single pupil without shifting the viewing point mages to output the shifted images, thereby implementing a glasses-type stereoscopic display preventing visual fatigue, and also in which a user may view the viewing point images using polarization glasses, thereby preventing visual fatigue from occurring.

The method for driving a glasses-type stereoscopic display preventing visual fatigue according to the above-described example embodiments may be recorded as computer-readable code/instructions in/on a computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although a few example embodiments have been shown and described, the present disclosure is not limited to the described example embodiments. Instead, it would be appreciated by those skilled in the art that changes may be made to these example embodiments without departing from the principles and spirit of the disclosure, the scope of which is defined by the claims and their equivalents.

What is claimed is:

1. A method for providing a super multi-view display, the method comprising:
generating, by a hardware unit, a plurality of left-eye viewing point images and a plurality of right-eye viewing point images, the plurality of left-eye viewing point images and right-eye viewing point images corresponding to different respective viewing points, wherein each of the plurality of left-eye viewing point images having different viewing points from each other is for being inputted into a left-eye pupil in a monocular multi-view type and each of the plurality of right-eye viewing point image having different viewing points from each other is for being inputted into a right-eye pupil in the monocular multi-view type; and
outputting, by the hardware unit, an initial left-eye viewing point image of the plurality of left-eye viewing point images and a subsequent left-eye viewing point image of the plurality of left-eye viewing point images, and an initial right-eye viewing point image of the plurality of right-eye viewing point images and a subsequent right-eye viewing point image of the plurality of right-eye viewing point images,
wherein the outputting comprises sequentially outputting each of the plurality of left-eye and right-eye viewing point images in a predetermined order.

2. The method of claim 1, wherein:
generating the subsequent left-eye viewing point image comprises shifting the initial left-eye viewing point image by a first interval to generate the subsequent left-eye viewing point image, and
generating the subsequent right-eye viewing point image comprises shifting the initial right-eye viewing point image by the first interval to generate the subsequent right-eye viewing point image.

3. The method of claim 2, wherein the first interval is calculated using at least one of a size of the respective pupil and a viewing distance.

4. The method of claim 1, wherein the outputting comprises outputting the initial left-eye viewing point image prior to the subsequent left-eye viewing point image, and outputting the initial right-eye viewing point image prior to the subsequent right-eye viewing point image.

5. A method for providing a super multi-view display, the method comprising:
generating, by a hardware unit, a plurality of left-eye viewing point images to output to a left-eye pupil in a monocular multi-view type, and a plurality of right-eye viewing point images to output to a right-eye pupil in the monocular multi-view type, the plurality of left-eye viewing point images and right-eye viewing point images corresponding to different respective viewing points; and
outputting, by the hardware unit, an initial left-eye viewing point image of the plurality of left-eye viewing point images and a subsequent left-eye viewing point image of the plurality of left-eye viewing point images, and an initial right-eye viewing point image of the plurality of right-eye viewing point images and a subsequent right-eye viewing point image of the plurality of right-eye viewing point images,
wherein the outputting comprises outputting each of the plurality of left-eye and right-eye viewing point images in a predetermined order comprising outputting the initial left-eye viewing point image of the plurality of left-eye viewing point images, outputting the subsequent left-eye viewing point image of the plurality of left-eye viewing point images, outputting the initial right-eye viewing point image of the plurality of right-eye viewing point images, and then outputting the subsequent right-eye viewing point image of the plurality of right-eye viewing point images, sequentially.

6. A method for providing a super multi-view display, the method comprising:
generating, by a hardware unit, a plurality of left-eye viewing point images to output to a left-eye pupil in a monocular multi-view type, and a plurality of right-eye viewing point images to output to a right-eye pupil in the monocular multi-view type, the plurality of left-eye viewing point images and right-eye viewing point images corresponding to different respective viewing points; and
outputting, by the hardware unit, an initial left-eye viewing point image of the plurality of left-eye viewing point images and a subsequent left-eye viewing point image of the plurality of left-eye viewing point images, and an initial right-eye viewing point image of the plurality of right-eye viewing point images and a subsequent right-eye viewing point image of the plurality of right-eye viewing point images,
wherein the outputting comprises outputting each of the plurality of left-eye and right-eye viewing point images in a predetermined order comprising outputting the initial left-eye viewing point image of the plurality of left-eye viewing point images, outputting the initial right-eye viewing point image of the plurality of right-eye viewing point images, outputting the subsequent left-eye viewing point image of the plurality of left-eye viewing point images, and then outputting the subsequent right-eye viewing point image of the plurality of right-eye viewing point images, sequentially.

7. A non-transitory computer-readable recording medium storing a program which, when executed, implements the method of claim 1.

* * * * *